United States Patent

Naclerio et al.

[11] Patent Number: 5,607,104
[45] Date of Patent: Mar. 4, 1997

[54] AUTOMOTIVE THERMOSTAT VALVE SUPPORT ASSEMBLY

[76] Inventors: Fred Naclerio; Josephine Naclerio, both of 1863 Adventure Pl., North Lauderdale, Fla. 33068; John Comito; Irene Comito, both of 10647 NW. 51st St., Coral Springs, Fla. 33076

[21] Appl. No.: 415,496

[22] Filed: Apr. 3, 1995

Related U.S. Application Data

[63] Continuation-in-part of Ser. No. 384,370, Feb. 2, 1995, abandoned, which is a continuation of Ser. No. 184,453, Jan. 21, 1994, abandoned.

[51] Int. Cl.$^6$ ........................................ F01P 7/16
[52] U.S. Cl. .......................................... 236/34.5
[58] Field of Search .................... 236/34, 34.5, 100, 236/42; 248/215, 318, 603

[56] References Cited

U.S. PATENT DOCUMENTS

| | | | |
|---|---|---|---|
| 1,873,769 | 8/1932 | Lang | 236/23.5 |
| 2,240,374 | 4/1941 | Newton | 236/100 X |
| 2,538,436 | 1/1951 | Weinberg | 236/42 X |
| 2,833,478 | 5/1958 | Middleton | 236/34.5 |
| 3,313,483 | 4/1967 | Nallinger | 236/34.5 |
| 4,014,506 | 3/1977 | Hanson | 248/311.1 |
| 4,550,693 | 11/1985 | Saur | 236/34.5 |
| 4,583,499 | 4/1986 | Hovey | 236/34.5 |
| 4,993,628 | 2/1991 | Reynolds | 236/34.5 |
| 5,024,378 | 6/1991 | Bergmann et al. | 236/100 X |
| 5,123,591 | 6/1992 | Reynolds | 236/34.5 |

*Primary Examiner*—William E. Tapolcal
*Attorney, Agent, or Firm*—Oltman Flynn & Kubler

[57] ABSTRACT

A thermostat valve support assembly for a a vehicle is disclosed. The assembly includes a cylindrical ring body which supports the thermostat valve component, and three flat arms extending from the body with hook ends on each arm. The valve support assembly is inserted into one end of a coolant hose such as the upper radiator hose in an engine compartment until the hook ends become bent over the hose end. The end of the hose is then positioned about a flange-neck connection point of the engine block or the radiator, and is clamped in place until a watertight seal is formed. The arms can be formed from plastic or metal such as aluminum, galvanized steel, brass, tin, copper or combination thereof. The location of the assembly allows for an easier installation and removal of the thermostat valve as compared to prior valves which are generally located in hard to reach locations. The preferred embodiment has an adapter ring encircling the thermostat valve body and sized to fit the hose in which the body is inserted so that rings of different outside diameters can be used with hoses of different sizes. The thermostat valve body can be one size for all hose sizes. An adjustable device is provided for adjusting the temperature setting of the thermostat valve.

2 Claims, 2 Drawing Sheets

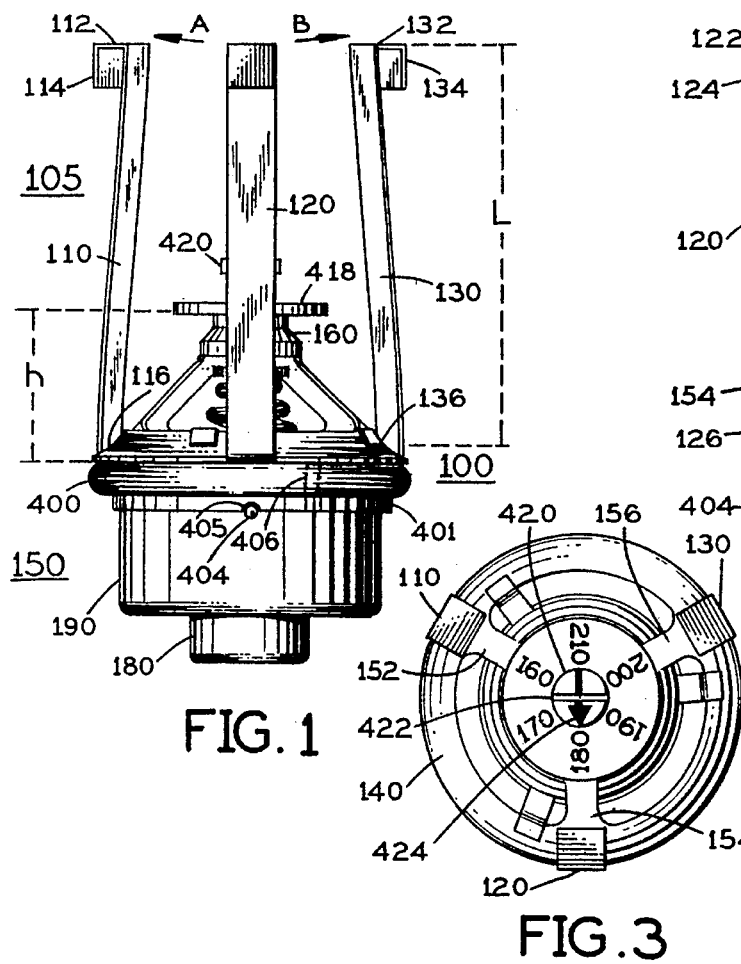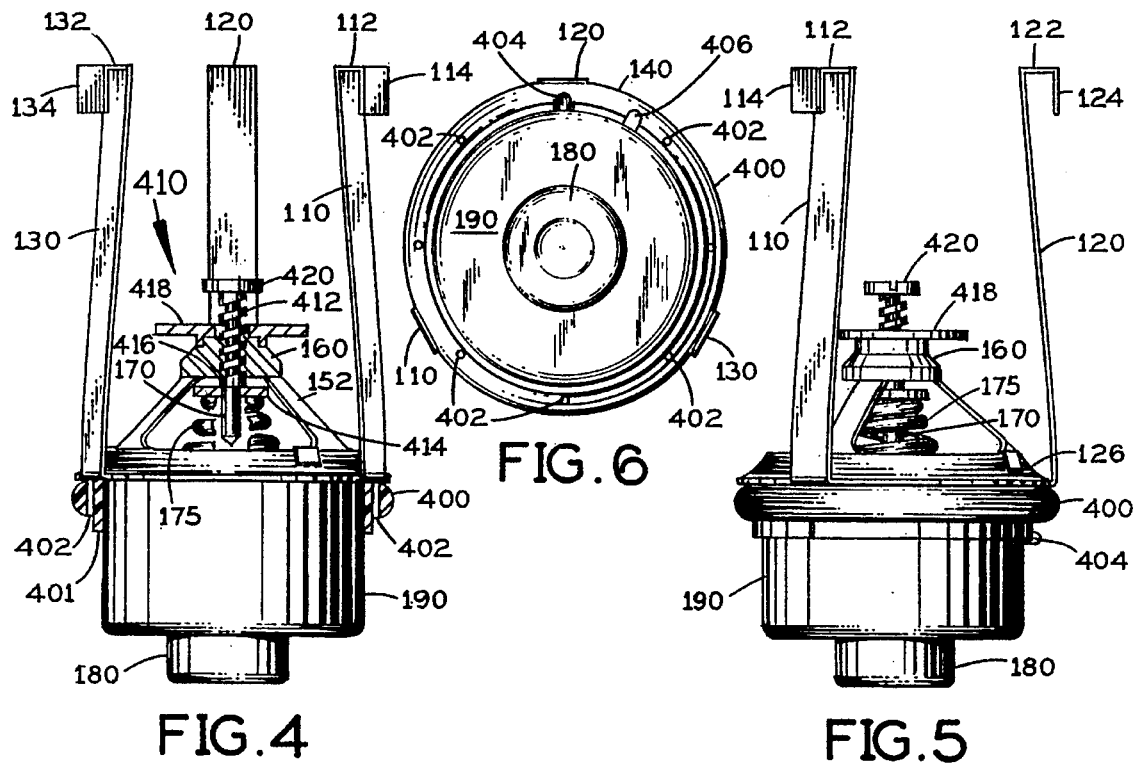

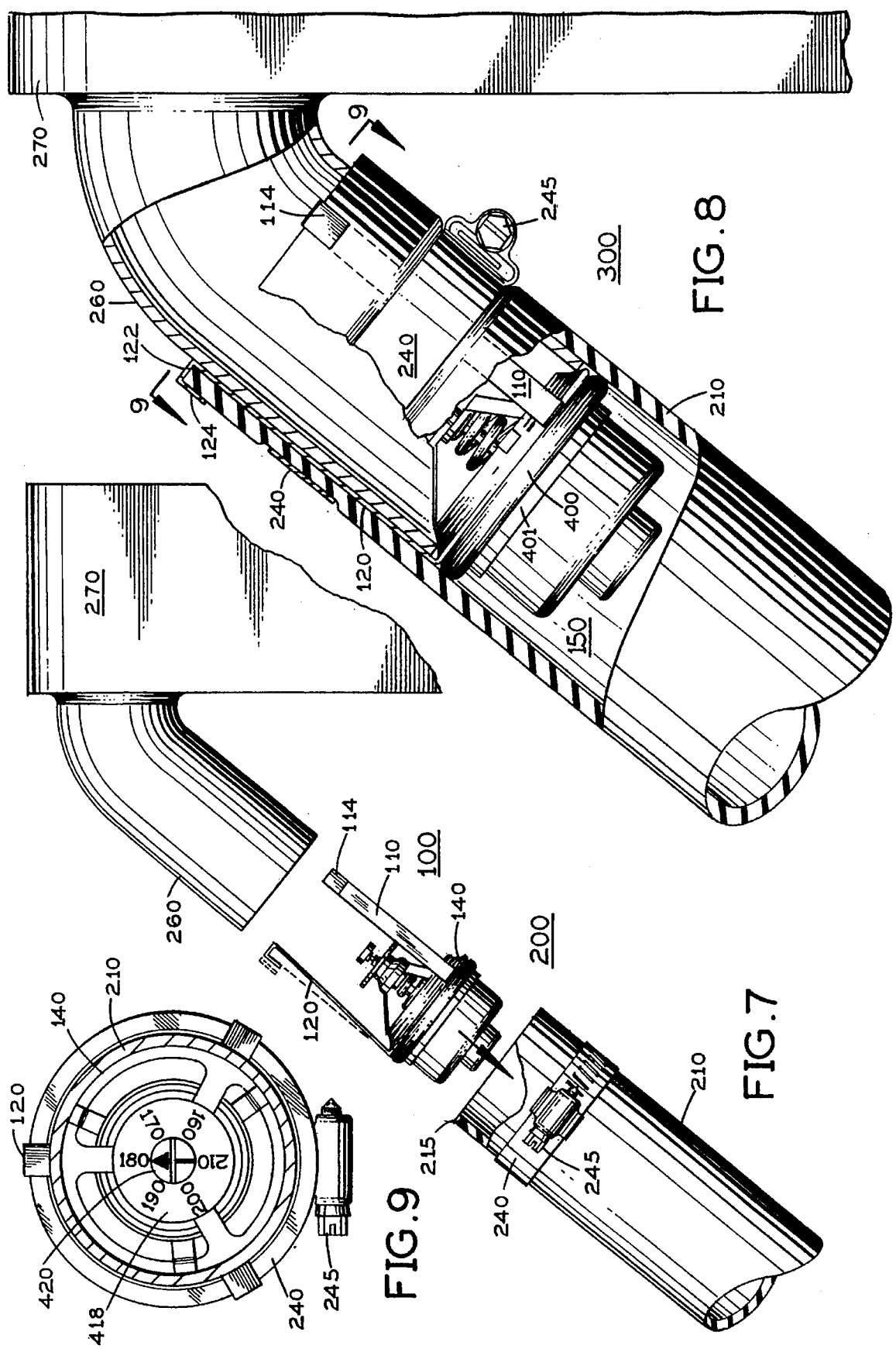

AUTOMOTIVE THERMOSTAT VALVE SUPPORT ASSEMBLY

RELATED APPLICATION

This application is a continuation-in-part of application Ser. No. 08/384,370 filed Feb. 2, 1995 and now abandoned, which is a continuation of application Ser. No. 08/184,453 filed Jan. 21, 1994 and now abandoned.

FIELD OF INVENTION

This invention relates to thermostat valves, and in particular to a support assembly for positioning a thermostat valve in a coolant hose of a vehicle.

BACKGROUND AND PRIOR ART

The location of thermostats in vehicles has made their replacement costly and time consuming. Most thermostat valves are located in a housing near the engine block and are difficult to change due to the complexities of the engines and engine accessories that may be in the way. The routings of hoses and the placements of various components around the thermostat housing make it usually difficult to change the thermostat valve.

Thermostat valves are necessary to control the engine heat build-up caused by running combustion engines. The thermostat valve is used to control the flow of cooling fluid between a radiator and the engine that needs to be cooled. The valve usually remains in a closed position until a certain threshold temperature is reached and then the valve moves to an open position and allows the coolant to pass therethrough. Under normal operating conditions, cooling fluids generally do not circulate through both the engine and the radiator until the threshold temperature is reached. At the threshold point the valve opens and cooling fluid circulates between the engine and radiator flow lines.

SUMMARY OF THE INVENTION

The first objective of the present invention is to provide a thermostat valve support assembly that can be located in an accessible location.

The second object of this invention is to provide a thermostat valve support assembly that can be readily inserted and removed from a coolant hose.

The third object of this invention is to provide a thermostat valve assembly that can be held in place by the existing clamp between the coolant hose and the flange-neck connection point of the radiator of a vehicle.

A preferred embodiment of the valve support assembly includes a cylindrical metal ring which supports the thermostat valve, and is connected to three flat metal arms with hook ends extending therefrom. The valve support assembly is inserted into one end of a coolant hose until the hook ends become bent over the end of the hose. The end of the hose is then positioned about the flange-neck portion of the radiator, and is clamped in place until a watertight seal is formed. The arms can be formed from plastic or metal such as, but not limited to, aluminum, galvanized steel, brass, tin or copper. The location of the valve support assembly allows for an easier installation and removal of the thermostat valve as compared to prior valves which are generally located in hard to reach locations.

The preferred embodiment has an adapter ring encircling the thermostat valve body and sized to fit the hose in which the body is inserted so that adapter rings of different outside diameters can be used with hoses of different sizes. The thermostat valve body can be one size for all hose sizes.

An adjustable device is provided for adjusting the temperature setting of the thermostat valve.

Further objects and advantages of this invention will be apparent from the following detailed description of a presently preferred embodiment which is illustrated schematically in the accompanying drawings.

BRIEF DESCRIPTION OF THE DRAWINGS

FIG. 1 shows the front side of the automotive thermostat valve support assembly.

FIG. 2 shows the right side view of the invention along arrow A of FIG. 1.

FIG. 3 shows a top view of the invention of FIG. 1.

FIG. 4 shows a rear side view of the invention of FIG. 1 partly broken away.

FIG. 5 shows the left side view of the invention along arrow B of FIG. 1.

FIG. 6 shows a bottom view of the invention of FIG. 1.

FIG. 7 illustrates a breakaway view of the invention of FIG. 1 to be positioned between a radiator hose and the flange-neck connection point of a radiator.

FIG. 8 illustrates an exposed view of the invention of FIG. 1 after being positioned between a radiator hose and the flange-neck connection point of a radiator.

FIG. 9 illustrates a cutaway view along arrow 9 of FIG. 8.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

FIG. 1 shows the front side of the thermostat valve support assembly 100, which includes arm support section 105 with three arms 110,120,130 connected to a standard thermostat valve 150. The valve 150 can be of a conventional thermostat valve design such as the types used in U.S. Pat. Nos. 2,996,254 to Freismuth, and 4,583,499 to Hovey which are both incorporated by reference. Standard valve 150 generally includes circumferential ring 140 connected to spider legs 152,154 and 156 which are connected together at one end of cap 160. Beneath cap 160 a spring 175 surrounds a rod 170 which allows the small cylinder 180 to move relative to the large cylinder 190 and create a passage for fluid flow when a threshold temperature is reached. The thermostat valve 150 is connected to arm support section 105.

FIG. 2 shows the right side view of the invention 100 along arrow A of FIG. 1. FIG. 3 shows a top view of the invention 100 of FIG. 1. FIG. 4 shows a rear side view of the invention 100 of FIG. 1. FIG. 5 shows the left side view of the invention 100 along arrow B of FIG. 1. FIG. 6 shows a bottom view of the invention 100 of FIG. 1.

The thermostat valve 150 depicted in FIGS. 1–6 can be of various types that would include a circumferential ring body 140 that can be sized to fit within known radiator hose diameters such as, but not limited to, 1 inch, 1 & ¼ inch, 1 & ½ inch, 1 & ¾ inch and 2 inches. In use, circumferential ring body 140 can be sized by techniques such as grinding to snugly fit within specific diameter hoses. Alternatively, an adapter ring 400 can encircle the body 190 sized to fit the hose so that rings of different diameters can be used with different hoses. Metal or plastic arms 110, 120 and 130 are connected to circumferential ring 140 at points 116,126 and 136 by techniques such as, but not limited to, soldering or welding. The metal arms 110,120 and 130 can be formed from materials such as aluminum, galvanized steel, brass, tin, copper or combinations thereof. Metal arms 110,120 and 130 are generally pliable and thin and approximately 0.05 inches or less in thickness. Alternatively the whole device can be made of plastic.

In reference to FIGS. 1, 2, 4 and 5, the length of the arms 110,120,130 are variable but are long enough to locate the valve within one end of a coolant hose 210 (shown and discussed in relation to FIGS. 6–9). For example, if the height "h" between circumferential ring body 140 and cap 160 is 1 inch, then the length "L" of each arm must be greater than 1 inch. Lengths "L" of the arms can include 1 to approximately 3 & ½ inches. The outer ends of each arm 110,120,130 are shaped into hooks 114,124 and 134. The size of the hook bend portions 112,122 and 132 will depend on the thickness of the hose walls that the thermostat valves are used within. For example, if a radiator hose has a wall thickness of ⅛ inch, then the size of hook bend portions 112,122 and 132 are approximately ⅛ inch.

The adapter ring 400 has a plurality of axial holes 402 through it for allowing coolant to flow past the thermostat valve until the valve opens and coolant then flows through the valve. The valve body has a small protrusion 404 on it, and the adapter ring 400 has a flange 401 with a small recess 405 that fits around the protrusion 404 for locking the adapter ring in place. The flange 401 serves to stabilize the adapter ring.

The adapter ring 400 also has an internal axial groove 406 that will pass over the protrusion 404 when the adapter ring 400 is put on the body 190 and moved up against the ring 140. The adapter ring is turned to engage the recess 405 with the protrusion 404.

An adjustable device 410 is preferably provided for adjusting the temperature setting of the thermostat valve. Adjustable device 410 includes a screw 412 that is threaded through the cap 160 and has a rod portion 170 extending into the spring 175. There is a washer 414 butting against a shoulder 416 at the end of the threads so that the screw can turn. A second washer 418 is affixed to the cap 160, and it has temperatures 160–210 inscribed on its top surface (FIG. 3). The screw has a head 420 with a slot 422 and an arrow 424 which is turned to select one of the temperature settings 160–210. When turned clockwise, the screw compresses the spring 175 and increases the temperature needed to open the thermostat valve A preferred method of using the thermostat valve support assembly 100 depicted in the previous figures will now be discussed. In the first step, thermostat valve support assembly 100 is inserted into one end of a coolant hose 210, such as the upper radiator hose in the engine compartment, until hook bend portions 112,122 and 132 abut against the end edge 215 of hose 210. Secondly, the end of hose 210 is fit about flange-neck 260 of the radiator 270 until a portion of the hose overlaps a portion of the flange-neck, as depicted in FIG. 8. Third, C-clamp band 240 is tightened by screw 245 until hose 210 is sealingly compressed against flange-neck 260. FIG. 9 illustrates a cutaway view along arrow 9 of FIG. 8 and shows that circumferential adapter ring 400 is snugly fit within the diameter of hose 210.

To remove the thermostat valve support assembly 100 from hose 210, the previous steps are reversed. Thus, the construction of the thermostat valve support assembly 100 and its location near one end of a coolant hose 210 allows for the easy access and replacement of thermostat valves in vehicles.

Although the embodiment describes positioning the invention within and near the upper radiator hose connection point to the flange-neck of the radiator, the invention can be located at any point where the coolant fluid hoses are attached.

Although the preferred embodiment shows three arms, any number of arms can be used to hold the thermostat valve in place. And although the preferred embodiment refers to automobiles, the invention can be used in all types of devices where a thermostat valve is used such as, but not limited to, automobiles and trucks.

Although the standard valve 150 depicted in the figures shows the design of a small cylinder 180 extending from a large cylinder 190 with a spider 152,154,156 holding a spring 175 and rod 170, the invention can be used with any type of thermostat valve that is used with controlling coolant fluid flow.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A thermostat valve assembly adapted to be inserted into an end of a hose and having arms overlapping a portion of a neck of a radiator on which said hose fits, said thermostat valve assembly comprising:

a cylindrical body for supporting a thermostat valve, and having an axis;

thin, flat, ribbon-like arms affixed to said body and extending from said body parallel to said axis;

said body being adapted to be inserted into said end of said hose with said arms extending between said hose and said neck and projecting out of said end of said hose;

and said projecting arms including hook ends for wrapping around said end of said hose to retain said arms and said body in place within the end of the hose.

2. A thermostat valve assembly adapted to be inserted into the end of a hose, and having arms overlapping a portion of a neck of a radiator on which said hose fits, said thermostat valve assembly comprising:

a cylindrical body for supporting a thermostat valve, and having an axis;

thin, flat, ribbon-like arms affixed to said body and extending from said body parallel to said axis;

said body being adapted to being inserted into said end of said hose with said arms extending between said hose and said neck and projecting out of said end of said hose;

said projecting arms including hook ends for wrapping around said end of said hose to retain said arms and said body in place;

a separate adapter ring encircling said body, with said adapter ring being adapted to support said thermostat valve in said hose near said end of said hose; and adjustable means for adjusting a temperature setting of said thermostat valve assembly, said adjustable means including a screw entering said body;

a washer encircling said screw having numbers for temperature settings thereon; and a pointer on said screw for selecting a desired one of said temperature numbers.

\* \* \* \* \*